(12) United States Patent
Serencsits et al.

(10) Patent No.: US 12,434,858 B2
(45) Date of Patent: Oct. 7, 2025

(54) WORK PLATFORMS AND METHODS OF USE

(71) Applicant: The Boeing Company, Chicago, IL (US)

(72) Inventors: William L. Serencsits, Hollywood, SC (US); Luis F. Velasquez, Charleston, SC (US); Edward Ray Duncan, Goose Creek, SC (US)

(73) Assignee: THE BOEING COMPANY, Arlington, VA (US)

( * ) Notice: Subject to any disclaimer, the term of this patent is extended or adjusted under 35 U.S.C. 154(b) by 1122 days.

(21) Appl. No.: 17/372,858

(22) Filed: Jul. 12, 2021

(65) Prior Publication Data

US 2023/0010488 A1    Jan. 12, 2023

(51) Int. Cl.
*B64F 5/10*    (2017.01)
*E04G 1/15*    (2006.01)
*E04G 5/08*    (2006.01)

(52) U.S. Cl.
CPC .................. *B64F 5/10* (2017.01); *E04G 5/08* (2013.01); *B23P 2700/01* (2013.01); *E04G 2001/157* (2013.01)

(58) Field of Classification Search
CPC .................. B64F 5/10; B64F 5/40; B64F 5/60
See application file for complete search history.

(56) References Cited

U.S. PATENT DOCUMENTS

| | | | |
|---|---|---|---|
| 7,194,358 B2 | 3/2007 | Callaghan et al. | |
| 10,005,652 B1 | 6/2018 | Cui et al. | |
| 10,167,181 B2 | 1/2019 | Xu | |
| 11,718,426 B1* | 8/2023 | Duschl | B64G 5/00 |
| | | | 244/171.6 |
| 2005/0224439 A1 | 10/2005 | Bean et al. | |
| 2008/0256776 A1* | 10/2008 | Neuhaus | B64F 5/10 |
| | | | 29/446 |
| 2011/0014026 A1 | 1/2011 | Benzing | |
| 2012/0036700 A1 | 2/2012 | Mun | |
| 2012/0066907 A1 | 3/2012 | Gallant et al. | |
| 2016/0009155 A1 | 1/2016 | Oberoi et al. | |
| 2018/0361595 A1 | 12/2018 | Troy et al. | |

(Continued)

FOREIGN PATENT DOCUMENTS

| | | |
|---|---|---|
| CN | 102701122 B | 3/2015 |
| EP | 1537036 A1 | 6/2005 |

(Continued)

OTHER PUBLICATIONS

EP Search Report issued Aug. 25, 2022 in re EP Application No. 22166088.9.

(Continued)

*Primary Examiner* — Tyrone V Hall, Jr.

(74) *Attorney, Agent, or Firm* — COATS & BENNETT, PLLC (57) ABSTRACT

A work platform configured to support one or more workers in proximity to a workpiece. The work platform includes sliders that are aligned along the length of the workpiece. The sliders are laterally movable towards and away from the workpiece. The sliders are individually movable with a position of each of the sliders relative to the workpiece being a function of the rotational position of the workpiece.

20 Claims, 12 Drawing Sheets

(56) References Cited

U.S. PATENT DOCUMENTS

| | | |
|---|---|---|
| 2019/0185304 A1 | 6/2019 | Lesquir |
| 2019/0256226 A1 | 8/2019 | Shapoury et al. |
| 2019/0311555 A1 | 10/2019 | Troy et al. |
| 2020/0018079 A1 | 1/2020 | Richards et al. |

FOREIGN PATENT DOCUMENTS

| | | |
|---|---|---|
| JP | 2002087797 A | 3/2002 |
| JP | 2008050111 A | 3/2008 |
| JP | 2013052948 A | 3/2013 |
| KR | 20160000931 U | 3/2016 |

OTHER PUBLICATIONS

Wikipedia, "Holonomic (robotics)", online article, retrieved on Jun. 25, 2018, pp. 1-2, retrieved from: https://en.wikipedia.org/wiki/Holonomic_%28robotics%29.

* cited by examiner

WORK PLATFORMS AND METHODS OF USE

TECHNOLOGICAL FIELD

The present disclosure relates generally to the field of work platforms and, more specifically, to work platforms that adjust to accommodate a rotating workpiece.

BACKGROUND

Manufacturing facilities include platforms to position one or more workers in proximity to a workpiece. The platforms are large enough to hold one or more workers and the tools necessary to complete work on the workpiece. For large workpieces, the platforms are elevated above a floor. The platforms are designed to keep the workers safe while performing the work. This includes positioning the leading edge of the platform in proximity to the work piece. This prevents and/or reduces a gap between the platform and workpiece that could cause a worker to fall through to the floor, or to get their foot trapped which could lead to an injury. This also prevents tools and materials from inadvertently falling through the gap and down to the floor below.

At some facilities, the workpieces are positioned on a mandrel that rotates the workpiece. This is particularly applicable for large workpieces. This allows for the workpiece to rotate past the worker who remains on the platform and can perform work on an entire workpiece. For example, aircraft tooling is often constructed from multiple different large sections. The individual sections are mounted on a mandrel and then rotated to allow a worker to complete work tasks on the entirety of the section without moving from the platform. In one specific example, a fuselage of a large aircraft is constructed from multiple pieces that are each constructed and then subsequently attached together.

An issue with this type of platform is the workpiece may include a complex contoured shape with a varying nominal exterior surface. A work platform with a fixed shape is positioned at the workpiece to support the workers. Because of the shape of the workpiece, a gap is formed between the workpiece and the work platform at one or more rotational positions of the workpiece. The size of the gap can vary depending upon the complex contoured shape of the workpiece.

One current work platform addresses this issue by the platform being constructed from two or more smaller sections. The sections are configured to be manually moved by the workers to position the leading edges at the workpiece at each of the various rotational positions. This requires the workers to move off of the platform, insert safety guards, move the sections of the platform away from the work piece, rotate the work piece while the sections are positioned away, manually move the sections back to the workpiece, and remove the safety guards. Once the platform sections are placed back at the workpiece, the workers can again move onto the platform and begin work. This is a time-consuming process for the workers to move and reposition the platform sections. Further, no work can be performed on the workpiece while the workers are moving the platform sections.

Some current systems have included an automated work platform. Sensors are positioned to detect the size of the gap between the platform and the workpiece. However, the sensors can become dirty or otherwise blocked which prevent their operation. Further, these systems can have difficulty with detecting a size of the gap when irregular details of the workpiece such as small troughs and protrusions that can be positioned on the exterior of the workpiece. These irregular details can cause the sensors to improperly position the platform relative to the workpiece.

SUMMARY

One aspect is directed to a work platform configured to be positioned in proximity to a rotating workpiece. The work platform comprises sliders aligned along a length of the work platform with each of the sliders comprising a leading edge, a trailing edge, and opposing lateral edges. The sliders are arranged with the leading edges positioned towards the workpiece. One or more motors that move the sliders towards and away from the workpiece to maintain the leading edges at the workpiece. The position of the leading edges is a function of the sectional shape of the workpiece at the slider and the rotational position of the workpiece.

In another aspect, the sliders are positioned together with at least one of the lateral edges sliding along a lateral edge of an adjacent one of the sliders.

In another aspect, the platform comprises a base that supports the sliders, and rails mounted to the base and connected to the sliders with the rails engaged with the sliders for the sliders to move relative to the base.

In another aspect, the platform comprises a camshaft that is rotated by the one or more motors, cam paths spaced apart along the camshaft with each of the cam paths corresponding to the sectional shape of the workpiece at the cam path, and link members connected to the cam paths and the sliders.

In another aspect, the platform comprises a workpiece motor to rotate the workpiece, and a control unit configured to control the one or more motors and the workpiece motor to synchronize the movement of the sliders with the rotation of the workpiece.

In another aspect, the control unit is configured to maintain the leading edges of the sliders at a constant distance away from the workpiece with the movement of each of the sliders controlled by one of the one or more motors according to a predefined motion profile.

In another aspect, the platform comprises a mat connected to two or more of the sliders with the sliders being movable relative to the mat.

In another aspect, two or more of the sliders move different amounts during rotation of the workpiece.

One aspect is directed to a work platform configured to be positioned in proximity to a rotating workpiece. The work platform comprises a base and sliders supported by the base and that extend along the workpiece with the sliders located at a different position along the length of the workpiece. The sliders are movable relative to the base to adjust a distance of leading edges of the sliders relative to the workpiece. One or more motors move the sliders relative to the base. The movement of each of the sliders is a function of the sectional shape of the workpiece at the position of the slider along the length of the workpiece and a rotational position of the workpiece.

In another aspect, the sliders comprise a leading edge that is positioned towards the workpiece and lateral edges with the sliders being aligned together with the lateral edges of adjacent ones of the sliders in proximity to form a continuous floor.

In another aspect, two or more of the sliders move different amounts during rotation of the workpiece to maintain the leading edges of the sliders at the workpiece.

In another aspect, the work platform comprises cams spaced apart and positioned at the sliders with the cams comprising a cam path that corresponds to the sectional shape of the workpiece where the cam is located along the length of the workpiece, and link members that extend between cams and the sliders.

In another aspect, the work platform comprises a control unit configured to control the one or more motors to synchronize the movement of the sliders with the rotational position of the workpiece.

In another aspect, the sliders form a floor of the work platform.

In another aspect, the work platform comprises a mat that extends over and is connected to two or more of the sliders with the sliders being movable relative to the mat.

One aspect is directed to a method of aligning a work platform relative to a workpiece. The method comprises: positioning the work platform along a length of the workpiece with leading edges of sliders on the work platform positioned at the workpiece; rotating the workpiece while the work platform is positioned along the workpiece; and individually moving the sliders towards and away from the workpiece with the movement of each of the sliders being a function of the sectional shape of the workpiece at the slider and a rotational position of the workpiece.

In another aspect, the method further comprises maintaining the leading edge of the sliders at a constant distance away from the workpiece.

In another aspect, the method further comprises operatively connecting each of the sliders to a cam that comprises a cam path that corresponds to the sectional shape of the workpiece at the cam; and rotating each of the cams in a synchronized manner with the workpiece and laterally moving the sliders.

In another aspect, the method further comprises moving two or more the sliders different amounts while rotating the workpiece between a first rotational position and a second rotational position.

In another aspect, the method further comprises moving one or more of the sliders and concurrently maintaining a position of one or more of the sliders.

The features, functions and advantages that have been discussed can be achieved independently in various aspects or may be combined in yet other aspects, further details of which can be seen with reference to the following description and the drawings.

DETAILED DESCRIPTION

Figure 1:
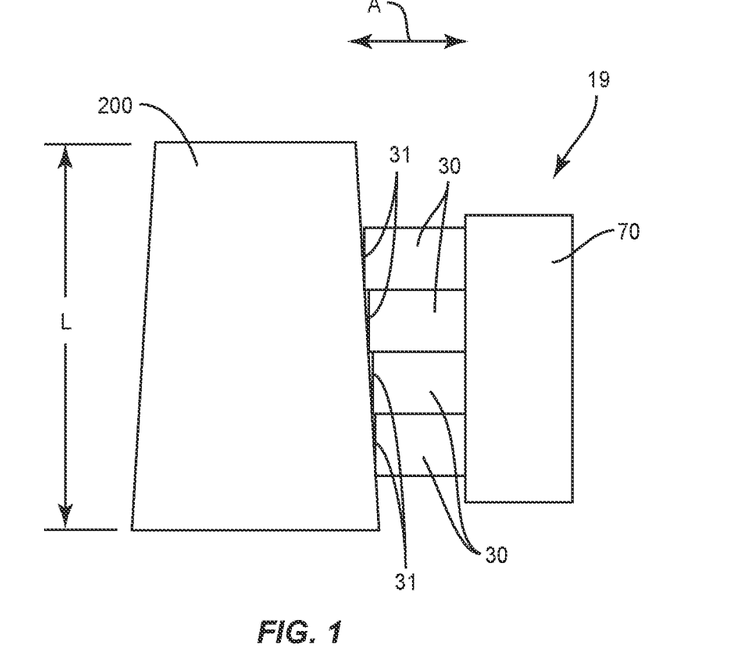
FIG. 1 is a schematic top view of a work platform with sliders that are aligned along the length of a workpiece.

The present application is directed to a work platform 19 as illustrated in FIG. 1 configured to support one or more workers in proximity to a workpiece 200. The work platform 19 includes sliders 30 that are aligned along the length L of the workpiece 200. The sliders 30 are movable towards and away from the workpiece 200 as illustrated in arrow A to maintain the leading edges 31 at the workpiece 200 to minimize and/or eliminate gaps. The sliders 30 are individually movable with a position of each of the sliders 30 being a function of the sectional shape of the workpiece 200 where the slider 30 is positioned and the rotational position of the workpiece 200.

Figure 2:
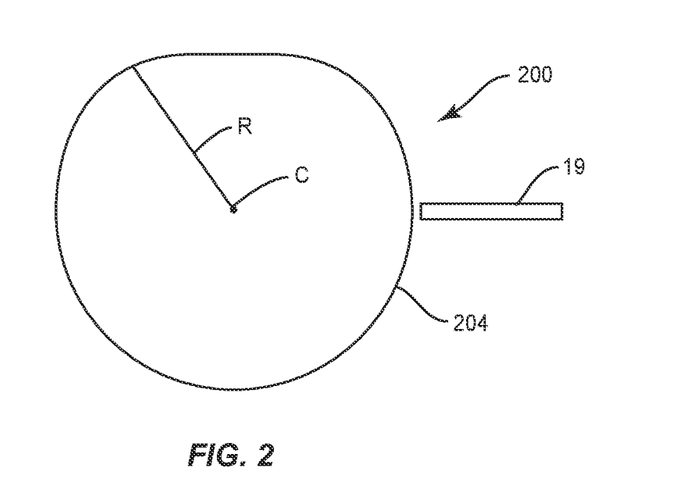
FIG. 2 is a schematic side view of a work platform positioned at a workpiece with a complex contoured shape.

The work platform 19 provides for the leading edge 31 of the sliders 30 to remain at the workpiece 200 during rotation of the workpiece 200. The workpiece 200 has a complex contoured shape along the length L. As illustrated in FIG. 2, this complex sectional shape has a non-constant cross section with a variable radius R measured between the centerline C and the nominal exterior surface 204. The lateral movement of the sliders 30 adjusts the position of the leading edges 31 relative to the workpiece 200 to prevent and/or reduce the size of a gap formed between the work platform 19 and workpiece 200. This reduction or elimination in the gap provides for a safe work environment for workers on the work platform 19.

Figure 3A:
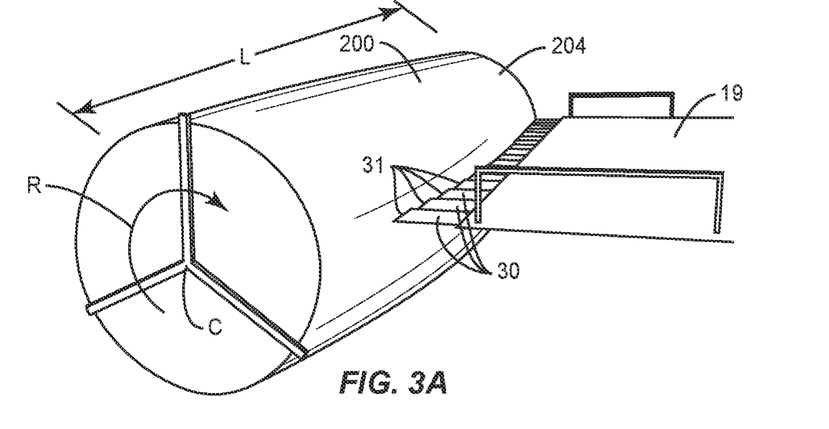
FIGS. 3A, 3B, and 3C illustrate a work platform positioned at a workpiece at three different rotational positions of the workpiece.
Figure 3B:
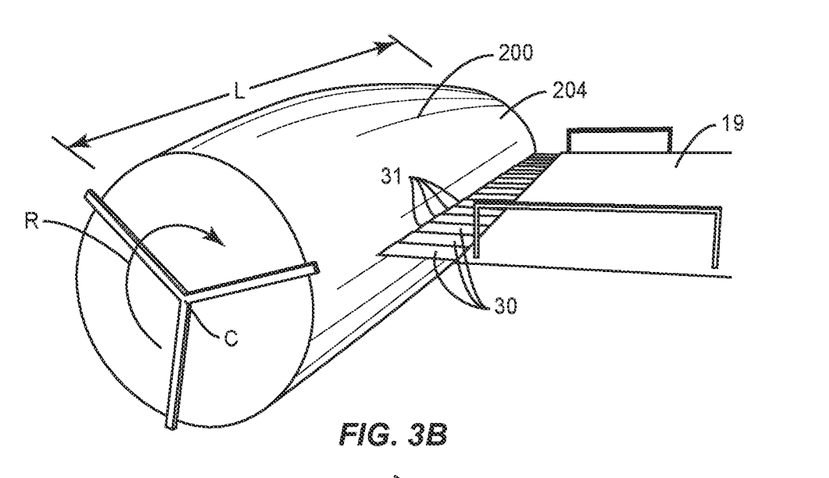
Figure 3C:
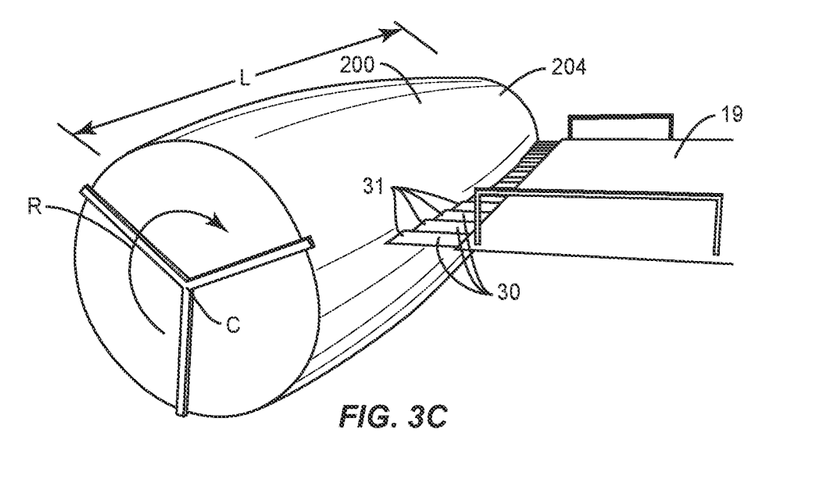

FIGS. 3A-3C illustrate the sliders 30 of the work platform 19 adjusting to accommodate the complex contoured shape of the workpiece 200. The work platform 19 is positioned with the leading edges 31 of the sliders 30 positioned towards the workpiece 200. In one example, the leading edges 31 are positioned against the exterior surface 204 of the workpiece 200. In another example, the leading edges 31 are positioned in close proximity, such as within 2 inches of the exterior surface 204.

Each of the sliders 30 is aligned at a different location along the length L of the workpiece 200. The movement of each slider 30 is a function of the sectional shape of the workpiece 200 at the location of the slider 30 and a rotational position of the workpiece 200. FIG. 3A illustrates the workpiece 200 at a first rotational position. Each of the sliders 30 is adjusted with the leading edges 31 positioned at the workpiece 200.

As illustrated in FIG. 3B, the workpiece 200 has rotated in the direction of arrow R about the center point C to a different second rotational position relative to the work platform 19. This different rotational position provides for a different point along the exterior surface 204 to be aligned with the sliders 30. Due to the complex contoured shape of the workpiece 200, one or more of the sliders 30 has laterally moved towards or away from the workpiece 200 to match the sectional shape where the slider 30 is positioned along the length L. Each of the sliders 30 moves separately from the other sliders 30. Thus, the amount of movement of each slider 30 is a function of the shape of the workpiece 200 at the location of the slider 30 and the rotational position of the workpiece 200. One or more of the sliders 30 may not move when the sectional shape of the workpiece 200 is constant between the different rotational positions.

FIG. 3C illustrates the workpiece 200 at a third rotational position relative to the work platform 19. Again, one or more of the sliders 30 has laterally adjusted relative to the workpiece 200 to conform to the sectional shape where the slider 30 is located along the length L. In each of the different rotational positions, the leading edges 31 of the sliders 30 remain at the workpiece 200 to eliminate and/or reduce gaps.

Figure 4:
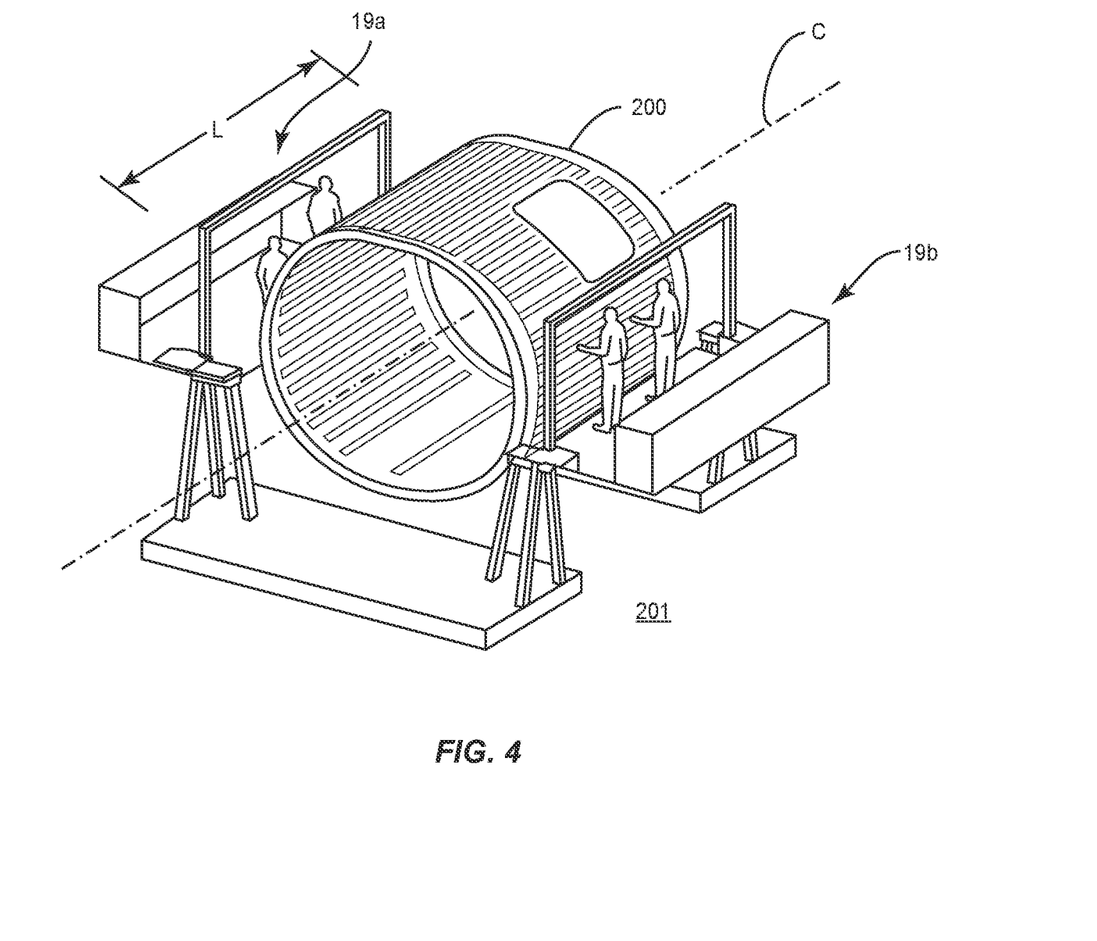
FIG. 4 is a perspective view of a pair of work platforms positioned along a workpiece.

The work platform 19 can be used to locate workers at various positions relative to the workpiece 200. FIG. 4 illustrates one example with a pair of work platforms 19a, 19b positioned on opposing sides of a workpiece 200. The work platforms 19 are elevated above the floor 201 and provide a structure to support one or more workers that are working on the workpiece 200. The work platforms 19 are positioned to allow the workers to access the workpiece 200 as the workpiece 200 is rotated about a centerline C.

The work platform 19 can include various lengths. In one example, the workstation 19 has a length that matches the length L of the workpiece 200. Other examples include a length that is shorter than the workpiece 200, and a length that is longer than the workpiece 200. The work platform 19 can include various numbers of sliders 30. In one example, the sliders 30 extend across the entirety of the work platform 19. In another example, the sliders 30 are positioned along a limited length of the work platform 19.

Figure 5:
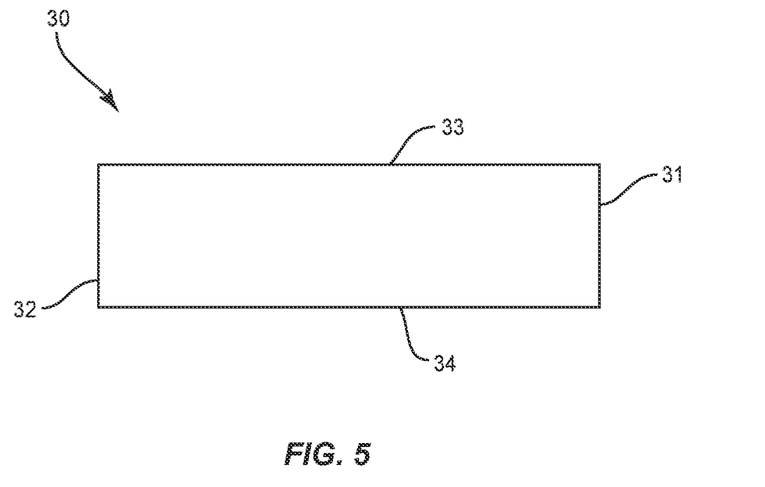
FIG. 5 is a schematic top view of a slider.

FIG. 5 illustrates a slider 30 that includes a leading edge 31 that is positioned towards the workpiece 200, an opposing trailing edge 32, and lateral sides 33, 34 that extend between the leading and trailing edges 31, 32. FIG. 5 includes a slider 30 with a substantially rectangular shape. Sliders 30 can also include various other shapes and sizes. In one example, each of the sliders 30 of a work platform 19 include the same shape and size. In another example, one or more of the sliders 30 includes a different shape and/or size. FIG. 5 further includes the leading edge 31 being flat and perpendicular to the lateral sides 33, 34. Other examples include the leading edge 31 having different shapes.

In one example as illustrated in FIG. 1, the sliders 30 are positioned with one or both of the lateral sides 33, 34 contacting against adjacent sliders 30. This spacing forms a continuous floor 73 as illustrated in FIG. 1 without spaces that could cause a trip hazard or provide for a tool to fall through to the floor 201 below. In another example, a space is positioned between one or both of the lateral sides 33, 34 and the adjacent sliders 30.

Figure 6A:
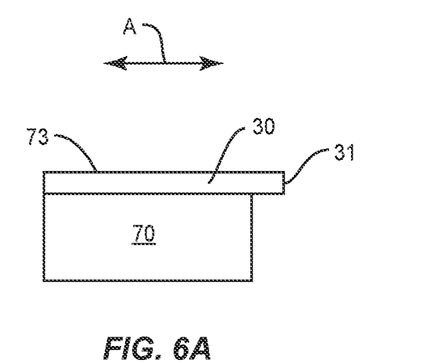
FIG. 6A is a schematic side view of a slider supported by a base.
Figure 6B:
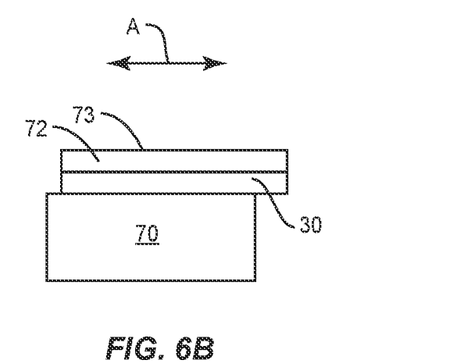
FIG. 6B is a schematic side view of a slider supported by a base a with a mat positioned on the slider.

The sliders 30 can be supported on the work platform 19 in a variety of different manners. FIG. 6A illustrates the sliders 30 being mounted to a top side of a base 70. In this example, the sliders 30 form the floor 73 on which the workers stand. To ensure the safety of the workers, the movement of the sliders 30 as illustrated by arrow A can be relatively small and/or slow to still provide for the floor 73 to safely support the workers. FIG. 6B includes an example in which a mat 72 is positioned on a top side of the sliders 30. The mat 72 can be attached to one or both of the sliders 30 and the base 70. The mat 72 can be formed from an elastic material, such as rubber to accommodate the moving sliders 30. The mat 72 forms the surface of the floor 73 and stretches during movement of the sliders 30 such that the workers do not feel the movement. In one example, the mats 72 have a rectangular shape and are connected at the corners to adjacent sliders 30. The mats 72 have a flexibility to accommodate the differences in movement between the sliders 30. In one specific example, adjacent sliders 30 can move a relative difference of about one inch during the lateral movement.

Figure 7:
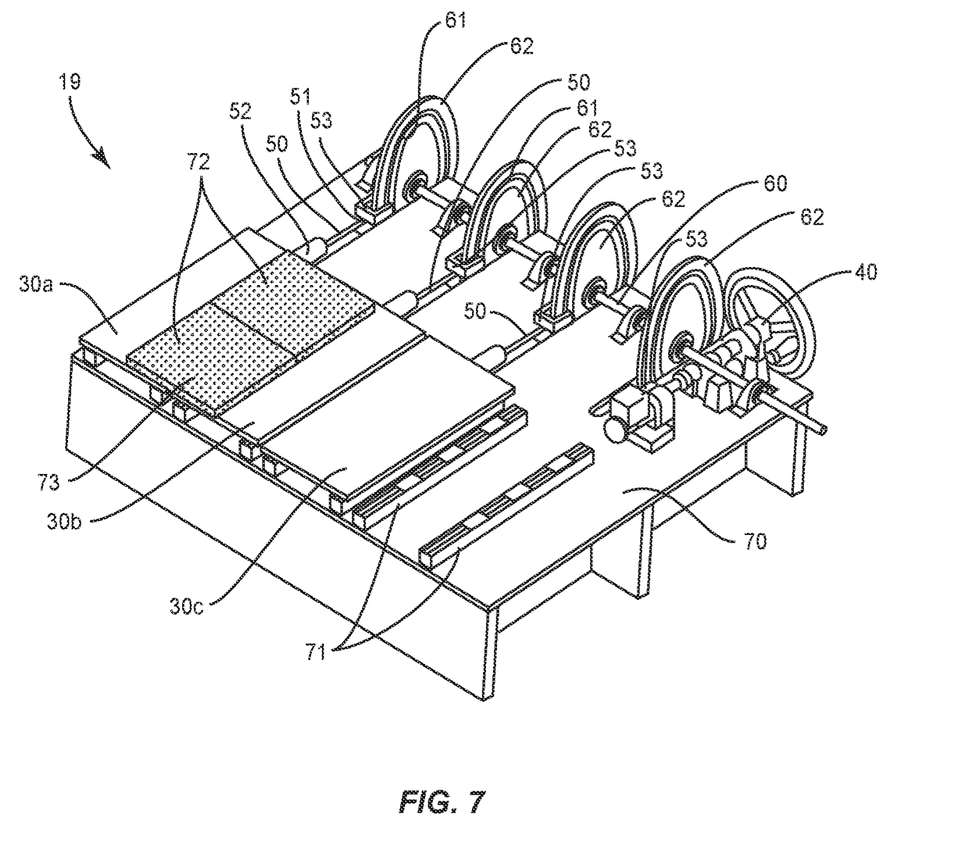
FIG. 7 is a perspective view of a partially-constructed work platform with three sliders mounted to a base and configured to be driven by a camshaft.

FIG. 7 illustrates a portion of a work platform 19 with sliders 30a, 30b, 30c positioned on a base 70. A slider is removed from the base 70 to illustrate rails 71 that are mounted to the base 70 and are configured to movably support the sliders 30 to provide for the lateral movement. Corresponding rails extend from the bottom of the sliders 30 and engage with the rails 71. A mat 72 extends over one or more of the sliders 30 and forms the floor 73. FIG. 7 includes just a pair of mats 72 attached to the sliders 72, however, additional mats 72 would be attached across the sliders 30 to form a larger and complete floor 73 when the work platform 19 is completely constructed.

Figure 8:
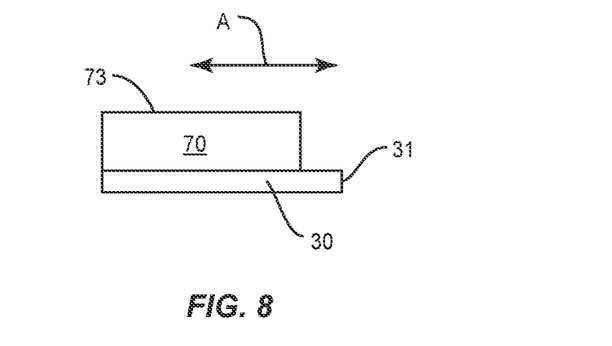
FIG. 8 is a schematic side view of a slider supported by a base.

In another example as illustrated in FIG. 8, the sliders 70 are positioned below the floor 73. In this example, the sliders 30 are positioned below the base 70 which forms the floor 73. The top surface of the sliders 30 extend the floor 73 outward from the base 70 towards the workpiece 200.

Figure 9:
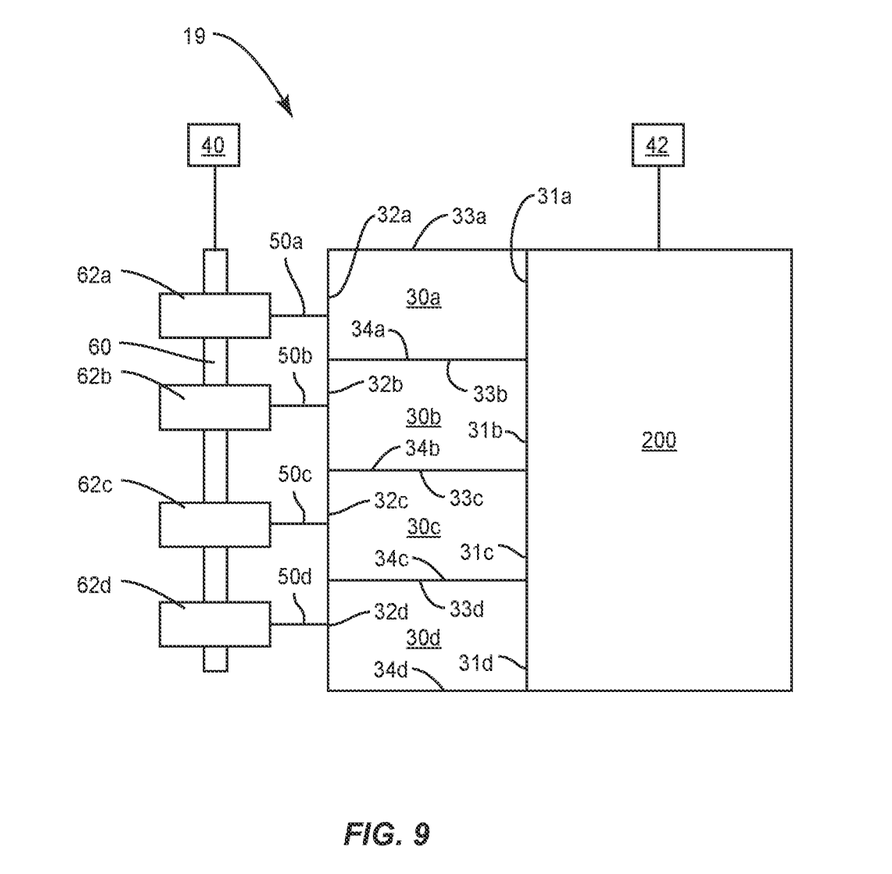
FIG. 9 is a top schematic view of a work platform positioned at a workpiece.

The sliders 30 can be driven in a number of different manners to move laterally for the leading edges 31 to remain at the workpiece 200. FIG. 9 illustrates one example that includes the sliders 30 connected to a camshaft 60 that is driven by a motor 40. The camshaft 60 is positioned in proximity to the sliders 30 and includes cams 62 spaced apart along the length. A link member 50 extends between each of the cams 62 and the corresponding slider 30. Each of the link members 50 follows a cam path on the corresponding cam 62 such that the movement of the slider 30 corresponds to the sectional shape of the workpiece 200 where the slider 30 is located.

Figure 10:
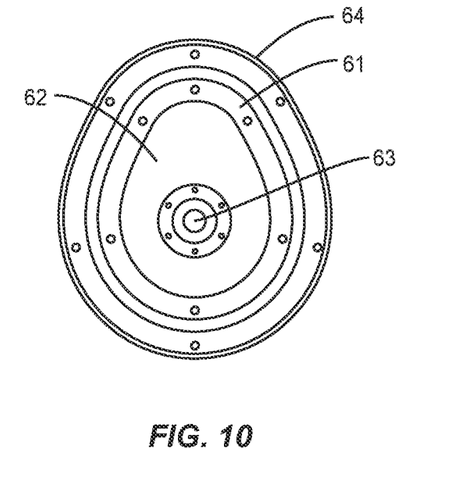
FIG. 10 is a side view of a cam.
Figure 11:
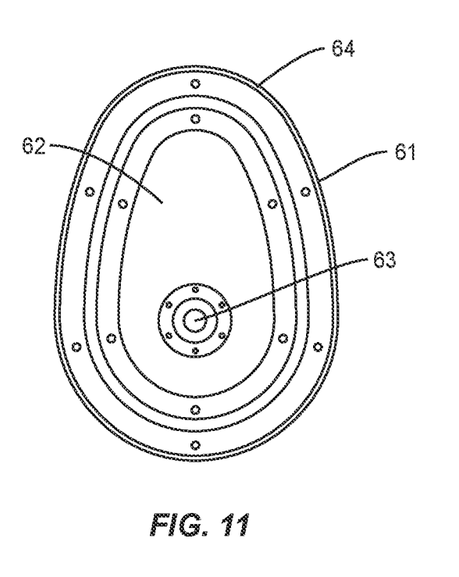
FIG. 11 is a side view of a cam.

The cams 62 each include a cam path 61 that is followed by the link member 50. The cam path 61 can be positioned at various locations on the cam 60. FIG. 10 illustrates a cam 62 having a complex shape with an irregular exterior edge 64. An opening 63 extends through the cam 62 to receive the camshaft 60. In this example, the cam path 61 is positioned inward from the exterior edge 64. FIG. 11 includes a cam 62 with the cam path 61 formed at the exterior edge 64.

The link member 50 operatively connects the slider 30 to the cam path 61. The link member 50 includes an elongated shape with a first end 51 attached to the cam path 61 and the second end 52 attached to the slider 30. In one example as illustrated in FIG. 7, the first end 51 includes a clevis 53 that extends on opposing sides of a cam 62 and rides within the cam path 61. In another example, the first end 51 rides in the cam path 61 that is recessed around the exterior edge of the cam 62. In another example, the second end 52 is attached to the slider 30 at the trailing edge 31. Other examples include an attachment at other points along the slider 30.

Figure 12:
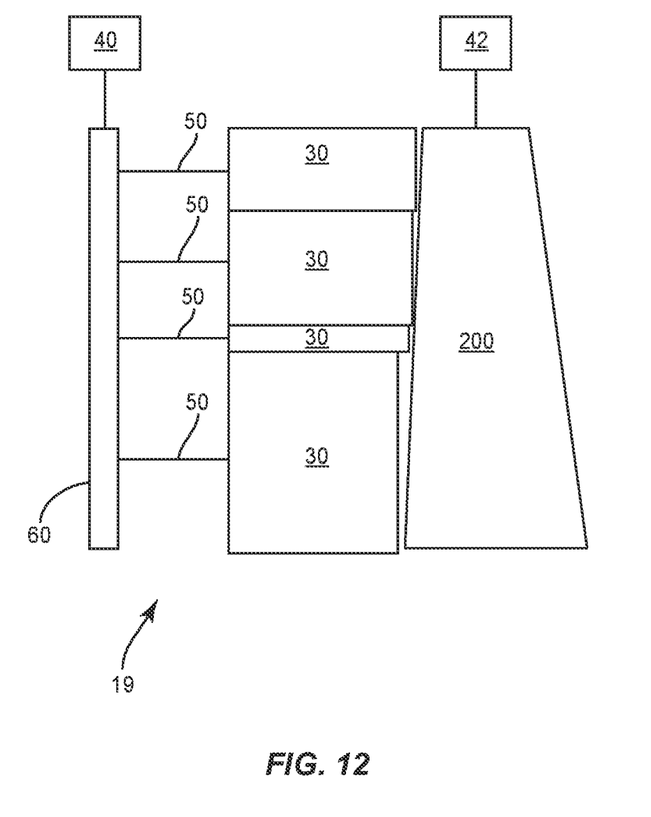
FIG. 12 is a top schematic view of a work platform positioned at a workpiece.

The motor 40 is connected to and configured to rotate the camshaft 60 to provide for the movement of the sliders 30 to be synchronized with the workpiece 200. In one example as illustrated in FIG. 12, the motor 40 is in communication with a motor 42 that rotates the workpiece 200. The motors 40, 42 are electrically linked to provide for the synchronized movement of the workpiece 200 and the sliders 30. In one example, motor 42 is attached to a mandrel that extends through the workpiece 200. In another example, a single motor, such as motor 40 or motor 42, is mechanically linked to and rotates both the camshaft 60 and the mandrel that extends through the workpiece 200.

Figure 13:
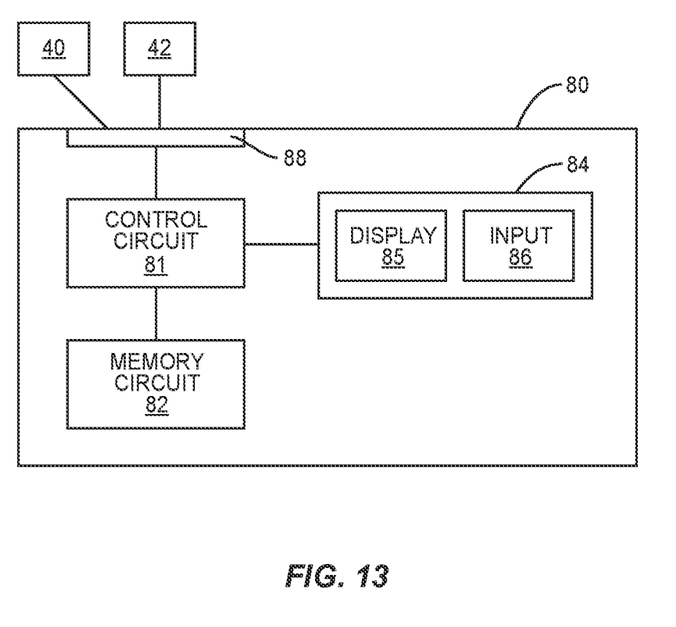
FIG. 13 is a schematic diagram of a control unit.

In one example, a control unit 80 provides for the synchronized movement. FIG. 13 illustrates a control unit 80 configured to control one or more of the motors 40, 42. An interface 88 provides for communicatively connecting with the motors 40, 42. The control unit 80 includes a control circuit 81 and a memory circuit 82. The control circuit 81 controls the operation of the motors 40, 42 according to program instructions stored in the memory circuit 82. Within examples, the control circuit 81 includes one or more circuits, microcontrollers, microprocessors, hardware, or a combination thereof. Memory circuit 82 includes a non-transitory computer readable storage medium storing program instructions, such as a computer program product, that configures the control circuit 81 to implement one or more of the techniques discussed herein. Memory circuit 82 can include various memory devices such as, for example, read-only memory, and flash memory. In one example, memory circuit 82 is a separate component as illustrated in FIG. 13. In another example, memory circuit 82 is incorporated with the control circuit 81. In one example, motion profiles for the sliders 30 are stored in the memory circuit 82 to control the movement of the sliders 30.

A user interface 84 provides for a user to control one or more aspects of one or more of the motors 40, 42. This can include one or more displays 85 for displaying information to the user. The user interface 84 can also include one or more input devices 86 such as but not limited to a keypad, touchpad, roller ball, and joystick. The one or more input devices 86 provide for the user to enter commands to the control circuit 81.

In one example, each of the motors 40, 42 is a stepper motor or a servo-controlled motor. The motors divide their rotational range into a series of equal steps. The control unit 80 can control their positions by signaling commands to move motors 40, 42 which provides for rotational movement in defined increments to the desired rotational positions. This incremental, stepped functionality provides for the control unit 80 to maintain the motors 40, 42 synchronized and the sliders 30 moving in accordance with the sectional shape of the nominal exterior surface 204 of the workpiece 200.

Figure 14:
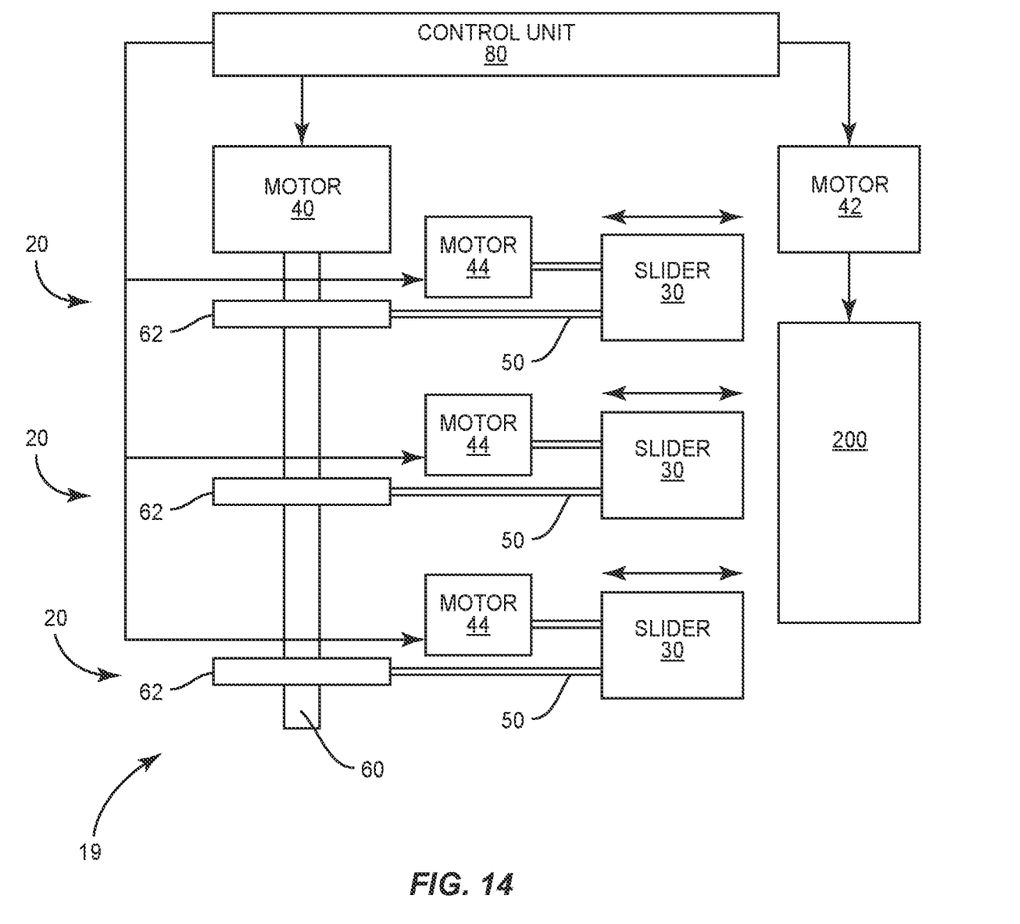
FIG. 14 is a top schematic view of a work platform positioned at a workpiece.

FIG. 14 illustrates another example of a work platform 19 that synchronizes the movement of the sliders 30. Motors 44 are attached to each of the sliders 30 to provide for the lateral movement to follow the workpiece 200. A camshaft 60 is driven by a motor 40 and operatively connected to each of the sliders 30 by a link member 50. In this example, the motors 44 are configured to provide the movement force, with the camshaft 60 and link members 50 attached to the sliders 30 to act as a redundant mechanical check of their synchronized movement with the workpiece 200. A control unit 80 oversees the operation and receives signals from and controls operations of the motors 40, 42, 44 to maintain the synchronized movement.

Figure 15:
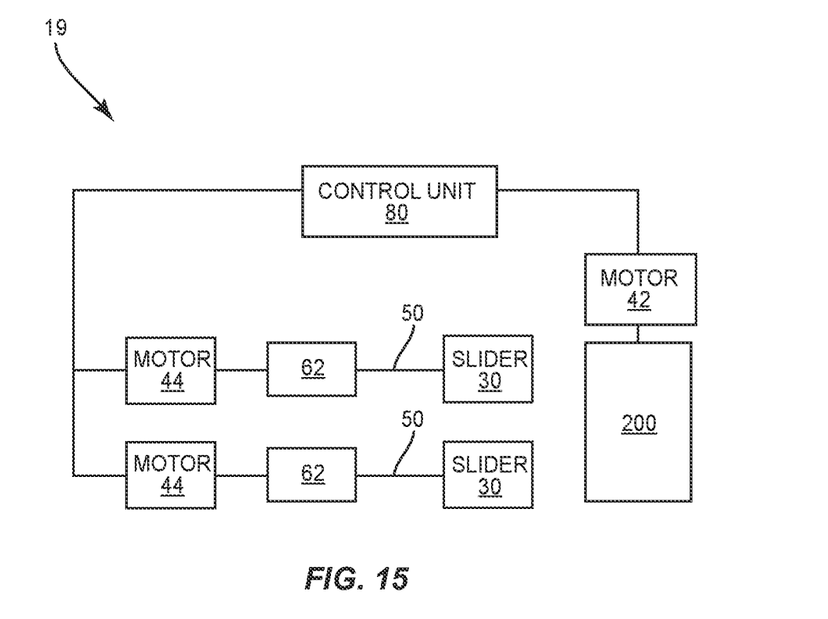
FIG. 15 is a top schematic view of a work platform positioned at a workpiece.

FIG. 15 illustrates an example in which the cams 62 are driven by separate motors 44. The cams 62 are operatively connected via link members 50 to the sliders 30 to control the lateral movement relative to the workpiece 200. A control unit 80 controls the operation of the motors 42, 44 to maintain the synchronized movement.

In one example of a work platform 19 with a camshaft 60, the cams 62 and link members 50 eliminate and/or reduce the risk of the sliders 30 becoming misaligned with the rotation of the workpiece 200. This maintained alignment ensures that the gaps formed between the sliders 30 and the workpiece 200 remain within an acceptable size and the sliders 30 do not contact against the workpiece 200.

Figure 16:
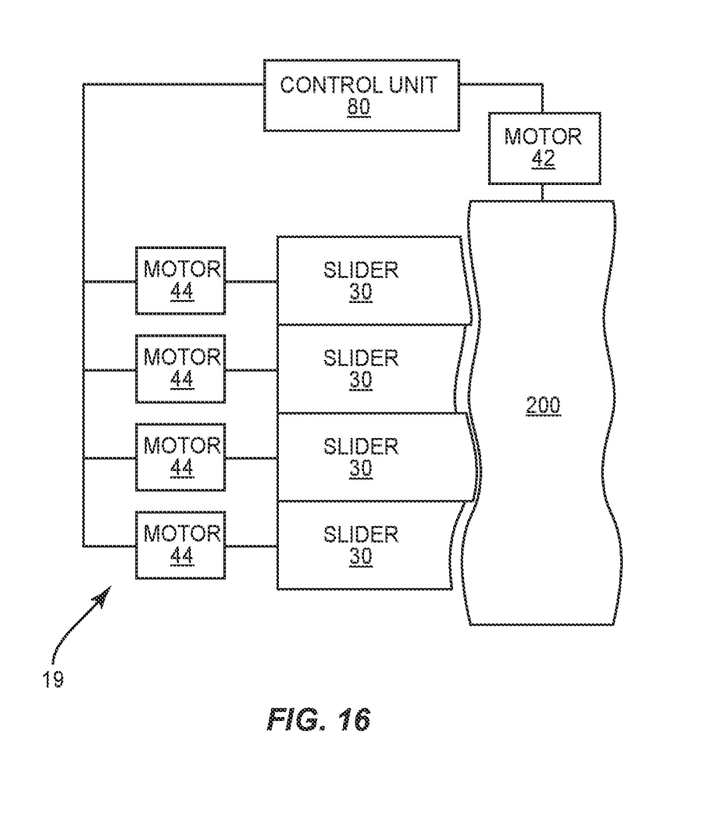
FIG. 16 is a top schematic view of a work platform positioned at a workpiece.

FIG. 16 illustrates an example in which motors 44 provide the force for moving the sliders 30 relative to the workpiece 200. A control unit 80 controls the operations of the motors 44 and operation of motor 42 that rotates the workpiece 200. The camshaft and link members have been removed from this example as the digital control of the motors 44 provides for the synchronization.

In one example, motors 44 that drive the sliders 30 are used for large work platforms 19 that include a large number of sliders 30. The motors 44 can drive the sliders 30 and provide for more accurate movement than may be possible with a camshaft 60. In one example, a work platform 19 that uses slider motors 44 is about fifty feet long to extend along the length of a corresponding workpiece 200.

In another example, the motor 42 that rotates the workpiece 200 also provides a driving force to move the sliders 30. The motor 42 is mechanically linked to the sliders 30, such as a chain drive, gear drive, or shaft drive. Because the motor 42 provides the force for both rotation of the workpiece 200 and movement of the sliders 30, the movement of these components is synchronized.

Figure 17:
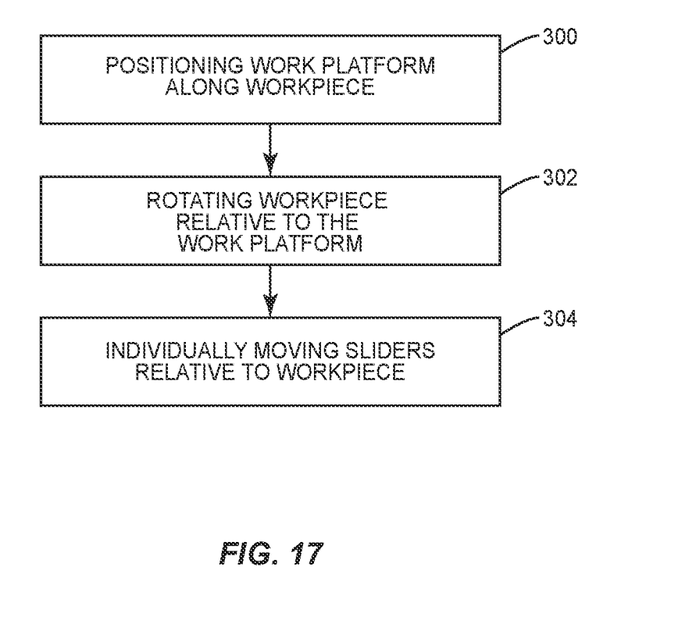
FIG. 17 is a flowchart diagram of a method of aligning a work platform 19 relative to a workpiece.

FIG. 17 illustrates a method of aligning a work platform 19 relative to a workpiece 200. The work platform 19 is positioned along a length of the workpiece 200 (block 300). This can include either moving the work platform 19 to the workpiece 200, moving the workpiece 200 to the work platform 19, or a combination of both. This includes positioning the leading edges 31 of sliders 30 at the workpiece 200. In one example, the work platform 19 includes a camshaft 60. The work platform 19 is positioned with a centerline of the camshaft 60 being parallel with a centerline of the workpiece 200. In one example, the sliders 30 have a centerline that is perpendicular to a centerline of the workpiece 200.

The workpiece 200 is rotated while the work platform 19 is positioned at the workpiece 200 (block 302). This provides for the one or more workers on the work platform 19 to continue working on the workpiece without having to move off of the work platform 19 to adjust the position. This provides for a higher production rate as the work area is brought to the workers in a fast, orderly process.

During the rotation, the method includes individually moving the sliders 30 towards and away from the workpiece 200 (block 304). The movement of each of the sliders 30 is a function of the sectional shape of the workpiece 200 at the slider 30 and a rotational position of the workpiece 200.

In one example, the distance between the leading edges 31 and the workpiece 200 varies during rotation of the workpiece 200. In another example, the distance between the leading edges 31 and the workpiece 200 remains constant.

The work platform 19 can be used for a variety of different workpieces 200. In one example, the work platform 19 is used for manufacturing composite aircraft components. Each component is constructed from overlapping composite sheets. The rotating workpiece 200 provides for the workers to apply the composite sheets around the entirety of the component to build the composite part.

The work platform 19 is applicable for positioning workers to perform work on a variety of different workpieces 200. One application includes work on an aircraft sections that have relatively large sizes. The types of aircraft can vary, including various commercial aircraft, manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present work platform 19 may be carried out in other ways than those specifically set forth herein without departing from the essential characteristics. The present embodiments are to be considered in all respects as illustrative and not restrictive, and all changes coming within the meaning and equivalency range of the appended claims are intended to be embraced therein.

What is claimed is:

1. A work platform configured to be positioned in proximity to a rotating workpiece, the work platform comprising:
   sliders aligned along a length of the work platform, the sliders comprising a leading edge, a trailing edge, and opposing lateral edges, the sliders are arranged with the leading edges positioned towards the workpiece;
   one or more motors that move the sliders towards and away from the workpiece to maintain the leading edges at the workpiece and with a position of the leading edges being a function of the sectional shape of the workpiece at the slider and the rotational position of the workpiece;
   a camshaft that is rotated by the one or more motors;
   cam paths spaced apart along the camshaft with each of the cam paths corresponding to the sectional shape of the workpiece at the cam path; and
   link members connected to the cam paths and the sliders.

2. The work platform of claim 1, wherein the sliders are positioned together with at least one of the lateral edges sliding along a lateral edge of an adjacent one of the sliders.

3. The work platform of claim 1, further comprising:
   a base that supports the sliders; and
   rails mounted to the base and connected to the sliders, the rails engage with the sliders for the sliders to move relative to the base.

4. The work platform of claim 1, further comprising:
   a workpiece motor to rotate the workpiece; and
   a control unit configured to control the one or more motors and the workpiece motor to synchronize the movement of the sliders with rotation of the workpiece.

5. The work platform of claim 4, wherein the control unit is configured to maintain the leading edges of the sliders at a constant distance away from the workpiece with the movement of each of the sliders controlled by one of the one or more motors according to a predefined motion profile.

6. The work platform of claim 1, further comprising a mat connected to two or more of the sliders with the sliders being movable relative to the mat.

7. The work platform of claim 1, wherein two or more of the sliders move different amounts during rotation of the workpiece.

8. A work platform configured to be positioned in proximity to a rotating workpiece, the work platform comprising:
   a base;
   sliders supported by the base and that extend along the workpiece with the sliders located at a different position along the length of the workpiece, the sliders being movable relative to the base to adjust a distance of leading edges of the sliders relative to the workpiece;
   one or more motors to move the sliders relative to the base; and
   a control unit configured to control the one or more motors to synchronize the movement of the sliders with the rotational position of the workpiece;
   the movement of each of the sliders being a function of the sectional shape of the workpiece at the position of the slider along the length of the workpiece and the rotational position of the workpiece.

9. The work platform of claim 8, wherein the sliders comprise a leading edge that is positioned towards the workpiece and lateral edges, the sliders being aligned together with the lateral edges of adjacent ones of the sliders in proximity to form a continuous floor.

10. The work platform of claim 8, wherein two or more of the sliders move different amounts during rotation of the workpiece to maintain the leading edges of the sliders at the workpiece.

11. The work platform of claim 8, further comprising:
    cams spaced apart and positioned at the sliders, the cams comprising a cam path that corresponds to the sectional shape of the workpiece where the cam is located along the length of the workpiece; and
    link members that extend between the cams and the sliders.

12. The work platform of claim 8, wherein the sliders form a floor of the work platform.

13. The work platform of claim 8, further comprising a mat that extends over and is connected to two or more of the sliders with the sliders being movable relative to the mat.

14. The work platform of claim 8, wherein the control unit is configured to control a workpiece motor that rotates the workpiece and wherein the control unit is configured to synchronize the workpiece motor and the one or more motors that move the sliders.

15. A method of aligning a work platform relative to a workpiece, the method comprising:
    positioning the work platform along a length of the workpiece with leading edges of sliders on the work platform positioned at the workpiece;
    rotating the workpiece with a first motor while the work platform is positioned along the workpiece;
    individually moving the sliders towards and away from the workpiece with one or more second motors with the movement of each of the sliders being a function of the sectional shape of the workpiece at the slider and a rotational position of the workpiece; and
    controlling the first motor and the one or more second motors to synchronize the rotation of the workpiece with the movement of the sliders.

16. The method of claim 15, further comprising maintaining the leading edge of the sliders at a constant distance away from the workpiece.

17. The method of claim 15, further comprising:
    operatively connecting each of the sliders to a cam that comprises a cam path that corresponds to the sectional shape of the workpiece at the cam; and
    rotating each of the cams in a synchronized manner with the workpiece and laterally moving the sliders.

18. The method of claim 15, further comprising moving two or more of the sliders different amounts while rotating the workpiece between a first rotational position and a second rotational position.

19. The method of claim 15, further comprising moving one or more of the sliders and concurrently maintaining a position of one or more of the sliders.

20. The method of claim 15, further comprising rotating the workpiece with the first motor in defined increments to desired rotational positions.

\* \* \* \* \*